US012723859B2

(12) United States Patent
Geyermann

(10) Patent No.: US 12,723,859 B2
(45) Date of Patent: Sep. 1, 2026

(54) ASSEMBLY FOR POSITION MEASUREMENT

(71) Applicant: DR. JOHANNES HEIDENHAIN GmbH, Traunreut (DE)

(72) Inventor: Dirk Geyermann, Siegsdorf (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 558 days.

(21) Appl. No.: 18/322,154

(22) Filed: May 23, 2023

(65) Prior Publication Data

US 2023/0392914 A1 Dec. 7, 2023

(30) Foreign Application Priority Data

Jun. 1, 2022 (EP) .................................... 22176780

(51) Int. Cl.
*G01B 3/04* (2006.01)

(52) U.S. Cl.
CPC .................................... *G01B 3/04* (2013.01)

(58) Field of Classification Search
CPC ........ G01B 3/04; G01B 5/00; G01D 5/24442; G01D 5/34753; G01D 5/34707
USPC .......................................................... 33/700
See application file for complete search history.

(56) References Cited

U.S. PATENT DOCUMENTS

2008/0191107 A1 8/2008 Pucher et al.
2016/0146641 A1 5/2016 Bauer et al.
2020/0284625 A1* 9/2020 Tamigniaux .......... G01B 21/02
2021/0318109 A1* 10/2021 Bauer ............... G01D 5/24442

FOREIGN PATENT DOCUMENTS

DE 102005027025 A1 * 12/2006 ......... G01D 5/34753
EP 3026389 A1 6/2016
EP 3705850 A1 9/2020
EP 3892962 A1 10/2021

* cited by examiner

*Primary Examiner* — John E Breene
(74) *Attorney, Agent, or Firm* — LEYDIG, VOIT & MAYER, LTD.

(57) ABSTRACT

An assembly includes a support and a scale disposed thereon extending in a longitudinal direction and having a measuring graduation disposed for position measurement. A first fastening device of the support is configured to support a first cross section of the scale at a first position in such a manner that it is freely movable in the longitudinal direction relative to the support and fixed in a transverse direction perpendicular to the longitudinal direction. A second fastening device of the support is configured to support a second cross section of the scale at a second position in such manner that it is fixed in the longitudinal and transverse directions. The fastening devices are configured to allow edge portions of the scale, which are disposed opposite each other in the transverse direction, to move relative to the support perpendicularly to a reference axis at the respective positions.

16 Claims, 19 Drawing Sheets

ASSEMBLY FOR POSITION MEASUREMENT

CROSS REFERENCE TO RELATED APPLICATIONS

This application claims benefit to European Patent Application No. EP 22176780.9, filed on Jun. 1, 2022, which is hereby incorporated by reference herein.

FIELD

The present invention relates to an assembly having a support with fastening devices and a scale disposed on the support.

BACKGROUND

EP 3 892 962 A1 discloses an assembly including a support and a scale disposed on the support. The scale extends in a longitudinal direction. The scale has a measuring graduation disposed in a measuring graduation plane and adapted for position measurement at least in the longitudinal direction. The support has a plurality of individual sections. The individual sections of the support are each configured as a fastening device for fastening the scale to the support. The fastening devices include fastening devices which are each of multi-piece construction.

Other assemblies including a plurality of fastening devices are known from DE 10 2005 027 025 A1, EP 3 026 389 A1, and EP 3 705 850 A1.

SUMMARY

In an embodiment, the present invention provides an assembly including a support and a scale disposed on the support. The support has a plurality of individual sections each configured as a fastening device. The scale extends in a longitudinal direction, and has a measuring graduation disposed in a measuring graduation plane for position measurement at least in the longitudinal direction. A first one of the fastening devices is configured to support a first cross section of the scale on the support at a first position in such a manner that the first cross section of the scale is freely movable in the longitudinal direction relative to the support and fixed in a transverse direction perpendicular to the longitudinal direction. A second one of the fastening devices is configured to support a second cross section of the scale on the support at a second position different from the first position in such manner that the second cross section of the scale is fixed in the longitudinal direction and in the transverse direction. The first and second fastening devices are configured to allow first and second edge portions of the scale, which are disposed opposite each other in the transverse direction, to move relative to the support perpendicularly to a reference axis at the respective first and second positions, the reference axis extending parallel to the longitudinal direction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
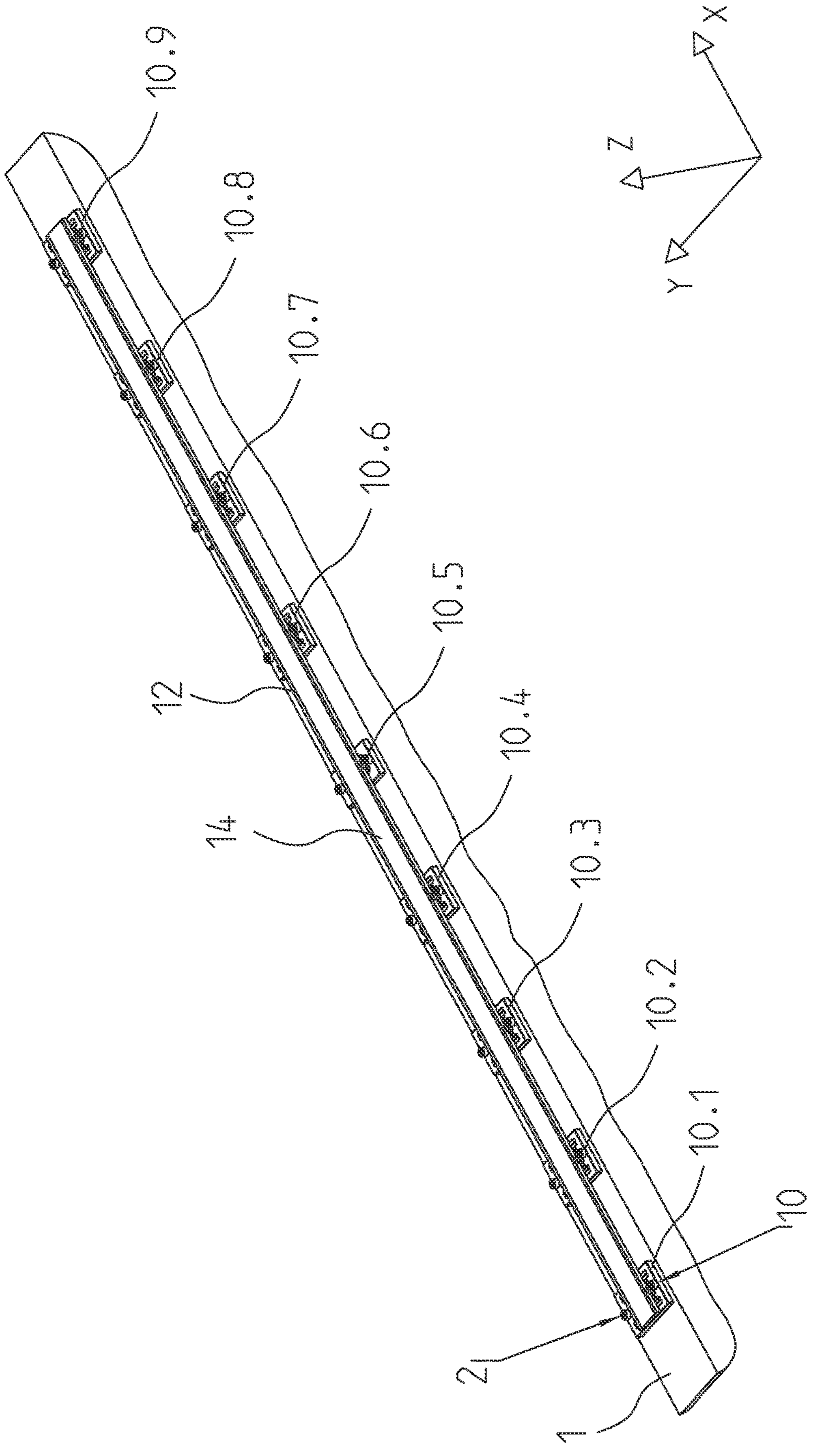
FIG. 1 is a perspective view of an exemplary assembly.

In an embodiment, the present invention provides an assembly for position measurement that is simple and cost-effective in design and permits accurate position measurement.

The assembly designed in accordance with an embodiment of the invention includes a support and a scale disposed on the support. The scale extends in a longitudinal direction. The scale has a measuring graduation disposed in a measuring graduation plane and adapted for position measurement at least in the longitudinal direction. The support has a plurality of individual sections. The individual sections of the support are each configured as a fastening device for fastening the scale to the support. The support has a first fastening device and a second fastening device. The first fastening device is configured to support a first cross section of the scale on the support at a first position in such a manner that it is freely movable in the longitudinal direction relative to the support and fixed in a transverse direction perpendicular to the longitudinal direction. The second fastening device is configured to support a second cross section of the scale on the support at a second position different from the first position in such manner that it is fixed in the longitudinal direction and in the transverse direction. The first and second fastening devices are configured to allow two first and second edge portions of the scale, which are disposed opposite each other in the transverse direction, to move relative to the support perpendicularly to a reference axis at the respective first and second positions. The reference axis extends parallel to the longitudinal direction.

"Supporting a cross section of the scale relative to or on the support" and "allowing an edge portion of the scale to move relative to the support" is understood to mean that the "supporting" and the "allowing" can occur with respect to a portion of the support that is fixedly connected to a base in a connected state of the support. When the support is in the connected state, the supporting or allowing occurs not only with respect to the fixedly connected portion of the support, but also with respect to the base (reference body).

Preferably, the reference axis is an axis of symmetry of the scale.

It is advantageous if the first and second fastening devices are configured to allow the first and second edge portions of the scale to move relative to the support toward or away from the reference axis at the respective first and second positions.

It is also advantageous if the first and second fastening devices are configured to allow the first and second edge portions of the scale to move relative to the support symmetrically with respect to the reference axis at the respective first and second positions.

The preferably symmetrical movement of the first and second edge portions is caused, for example, by thermal expansion or thermal contraction of the scale relative to the support. The thermal expansion or thermal contraction, in turn, results from different thermal expansion coefficients of a material of the scale and a material of the support.

Preferably, the first and second fastening devices are each of single-piece (i.e., not multi-piece) construction (which is referred to as "monolithic construction").

Preferably, the first fastening device and the first cross section of the scale as well as the second fastening device and the second cross section of the scale are respectively directly connected to each other. This is accomplished, for example, by a respective first and second, preferably rigid, material-to-material bond. "Directly connected to each other" means that the respective elements are connected to each other directly; i.e., not via one or more intermediate elements (e.g., immediate supports).

It is advantageous if the individual sections of the support are disposed separately from one another in the longitudinal direction.

It is also advantageous if the individual sections of the support are distributed, e.g., equidistantly distributed, in the longitudinal direction.

Preferably, the first fastening device is configured to support the first cross section of the scale on the support at the first position in such manner that it is fixed in the vertical direction (degree of freedom Z). The second fastening device is preferably configured to support the second cross section of the scale on the support at the second position in such manner that it is fixed in the vertical direction (degree of freedom Z).

The measuring graduation is preferably used for position measurement in in-plane degrees of freedom (i.e., degrees of freedom X, Y, RZ). In addition, the measuring graduation may also be used for position measurement in other degrees of freedom (i.e., degrees of freedom Z, RX, RY).

The measuring graduation is, for example, an incremental graduation. Alternatively, the measuring graduation may also be an absolute graduation, for example in the form of a pseudo-random code.

In an embodiment, the invention provides a simple and cost-effective design and also achieves high accuracy of position measurement. For this purpose, in particular, provision is made for a multi-piece support (i.e., the individual sections of the support) to provide the connection between the support and a base (e.g., machine bed). Moreover, the individual sections of the support form a plurality of fastening devices. The fastening devices serve firstly to (locally) fix a cross section of the scale in position relative to the support (hereinafter "outer local positional fixation") and secondly to provide for (respective local) decoupling of the cross section of the scale from the support (hereinafter "outer local decoupling"). The outer local positional fixation is effected at least with respect to the degrees of freedom X, Y. Furthermore, the outer local decoupling is effected in the degree of freedom X. In order to implement the outer local decoupling, there is in particular provided a first fastening device (hereinafter "flex element"). Moreover, in order to implement the outer local positional fixation, there is provided a second fastening device (hereinafter "fixed-point element"). The flex element and the fixed-point element additionally provide for (respective local) decoupling of edge portions of the scale with respect to the support (hereinafter "inner local decoupling"). The inner local decoupling is effected in the degree of freedom Y. The outer local decoupling and the inner local decoupling avoid, or at least reduce, effects caused by a change in temperature (e.g., constraining forces between the support and the scale). This substantially allows for accurate position measurement.

Other details and advantages of embodiments of the present invention will be apparent from the following description of exemplary embodiments in conjunction with the figures.

In the figures, like or functionally like elements are denoted by like reference numerals.

An embodiment of the invention will now be described with reference to FIGS. 1 and 2. The exemplary assembly includes a support 10 and a scale 12 disposed on support 10. Scale 12 extends in a longitudinal direction (main measurement direction) X and has a measuring graduation 14 disposed in a measuring graduation plane A1 (i.e., X/Y plane, see FIGS. 9*a* and 9*b*). Measuring graduation 14 is configured as a photoelectrically scannable incremental graduation for high-accuracy position measurement in longitudinal direction X and, in addition, in a second transverse direction Y extending perpendicularly thereto. Scale 12 is preferably composed of a material having a negligibly small thermal expansion coefficient, in particular a thermal expansion coefficient $\alpha$ of less than $1.5\times10^{-6}\ K^{-1}$, more particularly of less than $0.1\times10^{-6}\ K^{-1}$, in a temperature range from 0° to 50° C. Such materials include glass and glass-ceramic materials (e.g., Zerodur), as well as metals such as Invar, for example.

Support 10 is preferably made of steel having a thermal expansion coefficient of about $10.5\times10^{-6}\ K^{-1}$.

Support 10 includes a plurality of individual plate-like sections 10.1 through 10.9. The individual sections 10.1 through 10.9 of support 10 are each configured as a fastening device for fastening scale 12 to support 10. Scale 12 is cuboidal in shape (see FIG. 1).

Support 10 has a first fastening device (section 10.1) and a second fastening device (section 10.5). First fastening device 10.1 may also be referred to as a flex element. Second fastening element 10.5 may also be referred to as a fixed-point element.

The assembly shown in FIG. 1 is disposed on a base 1 (e.g., a machine bed or an additional support). Screws 2 are provided for attachment of the assembly to base 1. Screws 2 extend through the individual sections 10.1 through 10.9 into base 1. Base 1 is, for example, composed of a material (e.g., granite or aluminum) having a thermal expansion coefficient different from the thermal expansion coefficient of scale 12 and/or of support 10.

First fastening device 10.1 is configured to support a first cross section 12.1 (see FIG. 9*a*) of scale 12 on support 10 at a first position P1 (see FIG. 3*b*) in such a manner that it is freely movable in longitudinal direction X relative to support 10 and fixed in transverse direction Y. Second fastening device 10.5 is configured to support a second cross section 12.2 (see FIG. 9*b*) of scale 12 on support 10 at a second position P2 (see FIG. 4*b*) different from first position P1 in such manner that it is fixed in longitudinal direction X and in transverse direction Y.

Thus, first fastening device 10.1, as it were, allows for decoupling/positional fixation at first position P1 with respect to the following degrees of freedom: X_exterior free, Y_exterior fixed. Thus, second fastening device 10.5, as it were, allows for positional fixation at second position P2 with respect to the following degrees of freedom: X_exterior fixed, Y_exterior fixed.

First and second fastening devices 10.1, 10.5 are configured to allow two first and second edge portions 12.11, 12.21 (see FIGS. 9*a*, 9*b*) of scale 12, which are disposed opposite each other in transverse direction Y, to move relative to support 10 perpendicularly to a reference axis S (see FIG. 2) at the respective first and second positions P1, P2. As shown in FIG. 2, reference axis S extends parallel to longitudinal direction X.

Thus, first and second fastening devices 10.1, 10.5, as it were, allow for decoupling at the respective first and second positions P1, P2 with respect to the following degree of freedom: Y_interior free.

Figure 2:
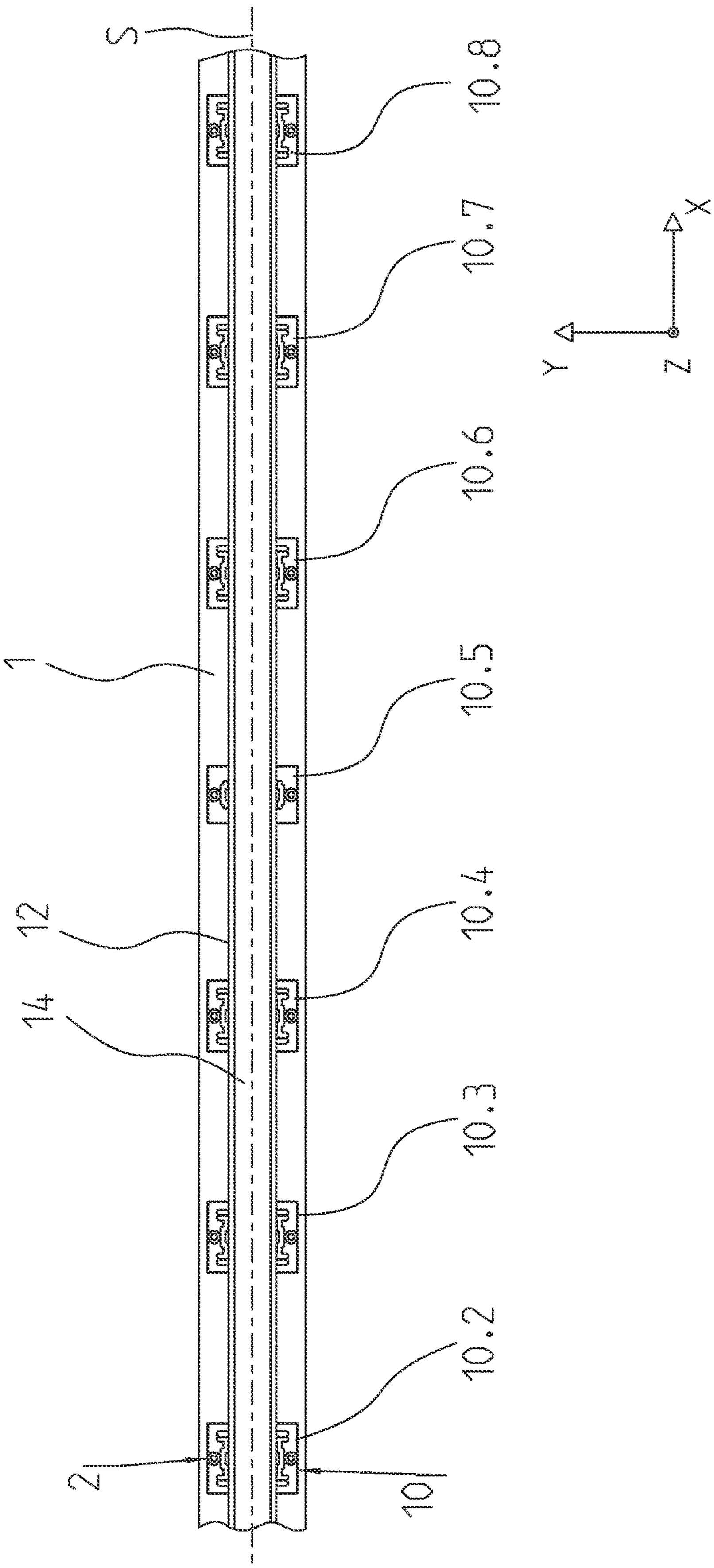
FIG. 2 is a plan view of the assembly of FIG. 1.

Referring to FIG. 2, reference axis S is an axis of symmetry (i.e., a centerline) of scale 12.

First and second fastening devices 10.1, 10.5 are configured to allow first and second edge portions 12.11, 12.21 of scale 12 to move relative to support 10 toward or away from reference axis S at the respective first and second positions P1, P2. "Movement toward reference axis S" means that the respective first and second edge portions 12.11, 12.21 move in opposite directions inwardly; i.e., toward the centerline of scale 12. Moreover, "movement in a direction away from reference axis S" means that the respective first and second edge portions 12.11, 12.21 move in opposite directions outwardly; i.e., away from the centerline of scale 12.

First and second fastening devices 10.1, 10.5 allow first and second edge portions 12.11, 12.21 of scale 12 to move relative to support 10 symmetrically with respect to reference axis S at the respective first and second positions P1, P2. "Symmetrical movement" is understood to mean that first and second edge portions 12.11, 12.21 move uniformly with respect of the magnitude and/or direction of the movement.

Figure 3A:
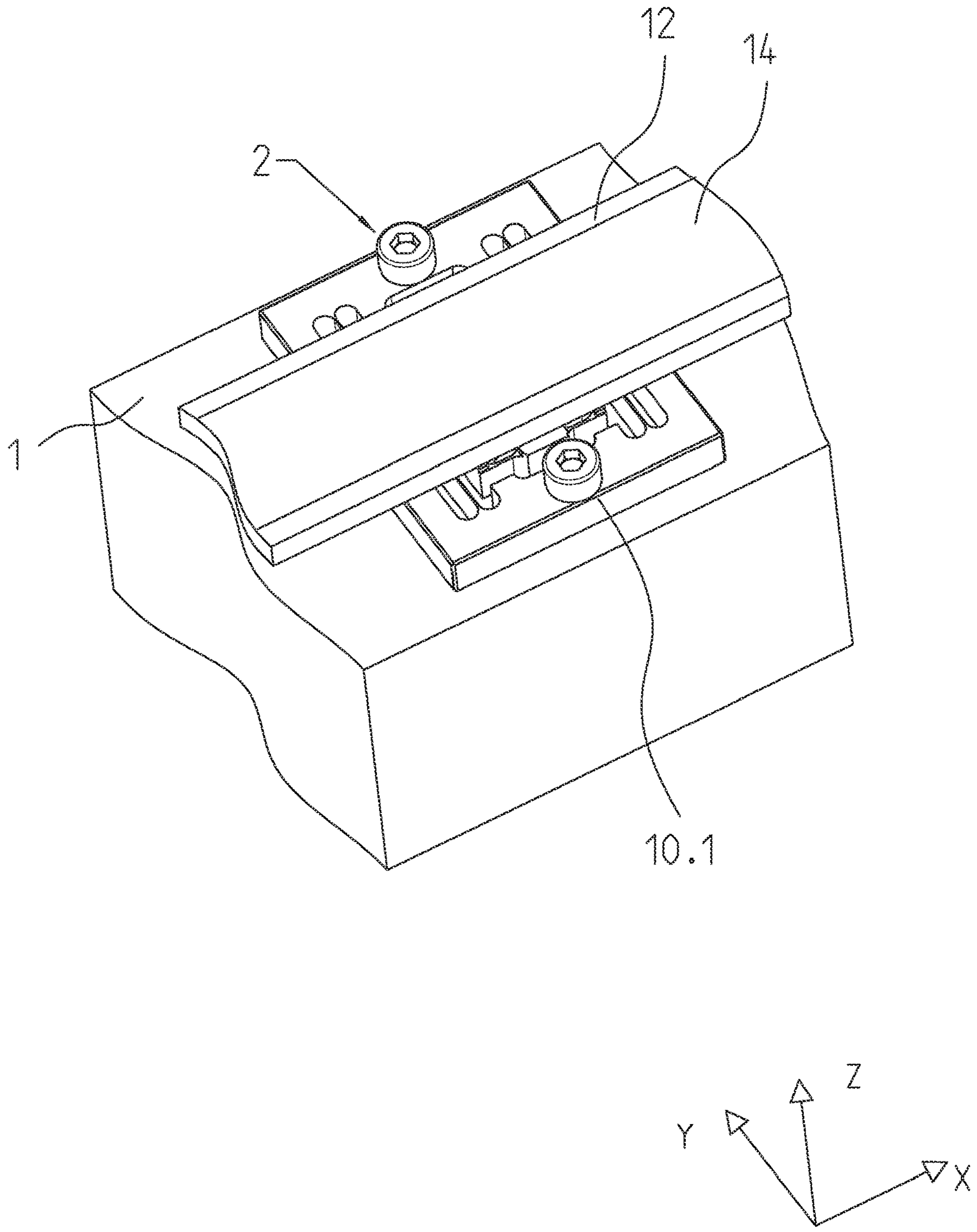
FIG. 3*a* is a perspective view of a first portion of the assembly of FIG. 1.
Figure 3B:
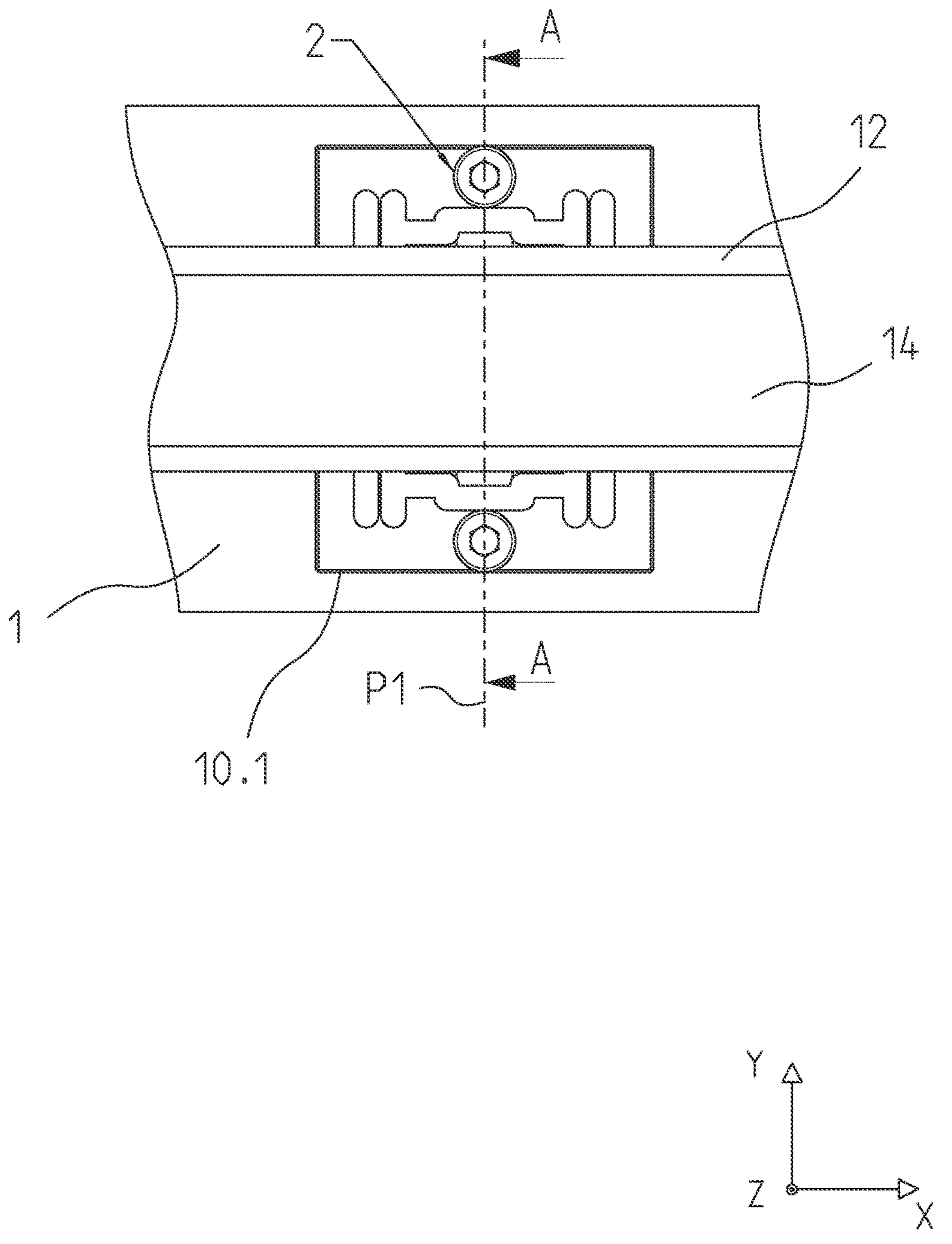
FIG. 3*b* is a plan view of the first portion shown in FIG. 3*a;*
Figure 4A:
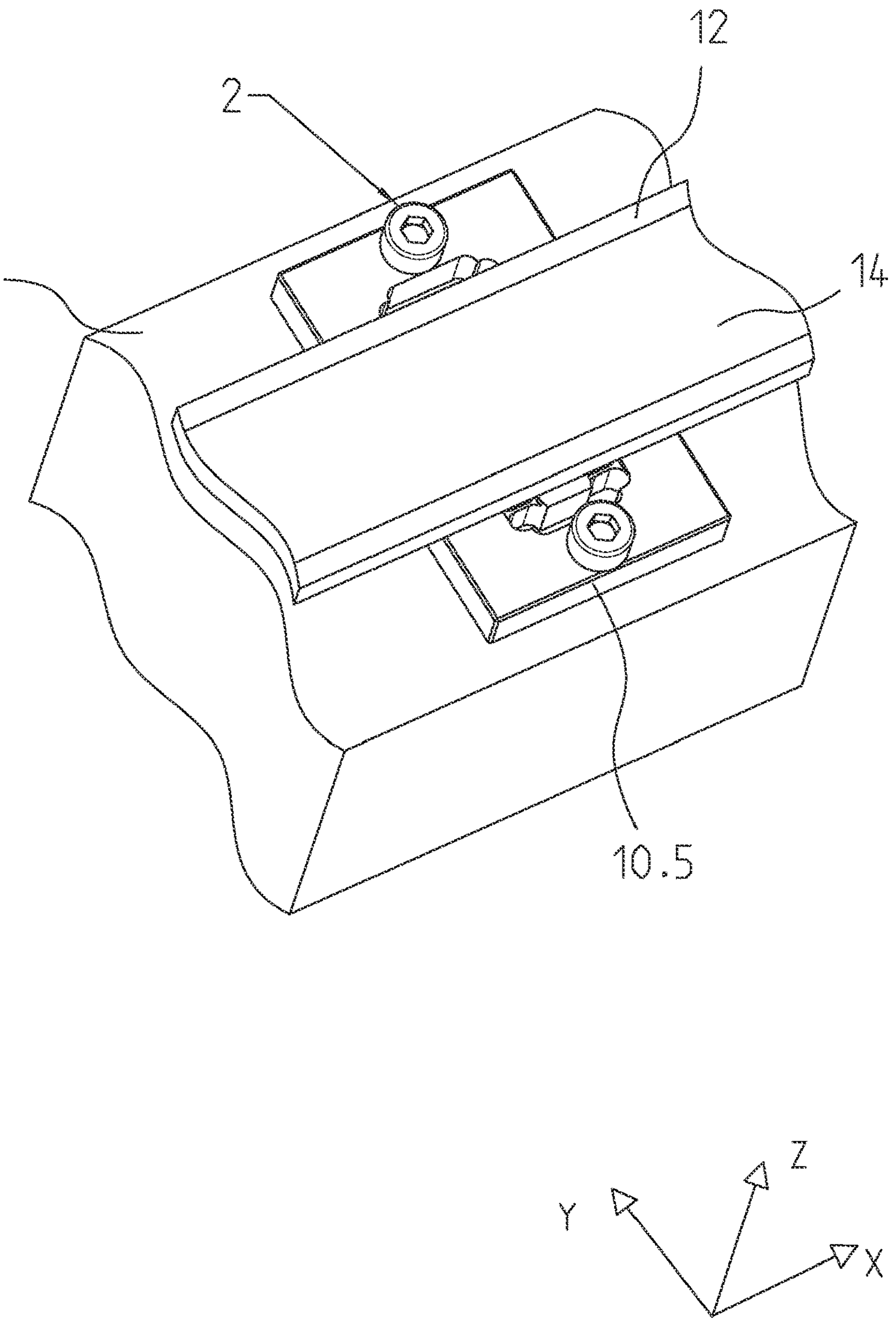
FIG. 4*a* is a perspective view of a second portion of the assembly of FIG. 1.
Figure 4B:
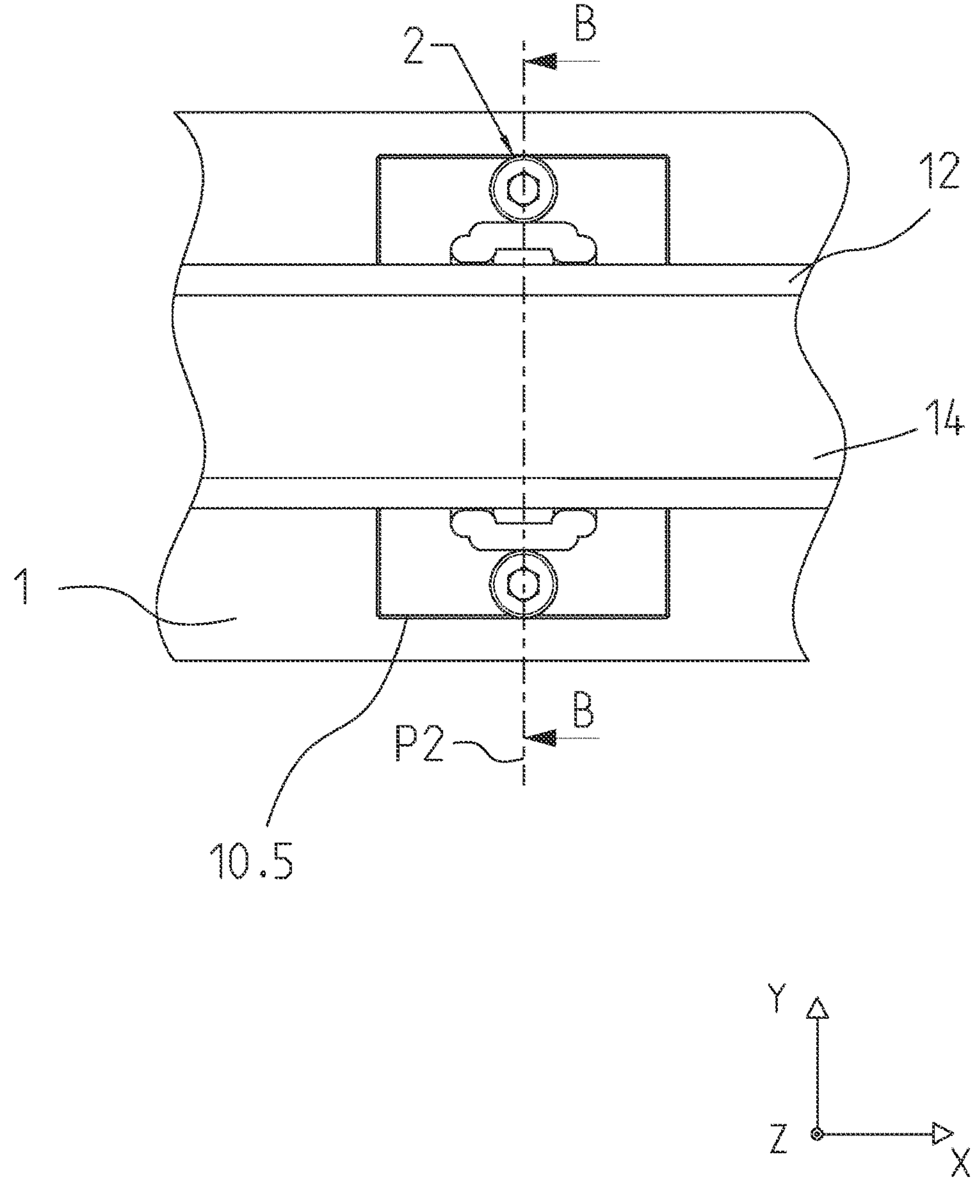
FIG. 4*b* is a plan view of the second portion shown in FIG. 4*a;*

FIG. 3*a* shows a perspective view of a first portion of the assembly of FIG. 1. The first portion shown in FIG. 3*a* includes first fastening device 10.1 (flex element). FIG. 4*a* shows a perspective view of a second portion of the assembly of FIG. 1. The second portion shown in FIG. 4*a* includes second fastening device 10.5 (fixed-point element). Further details of first and second fastening devices 10.1, 10.5 will be described below.

It should be noted that the other fastening devices (i.e., the individual sections 10.2 through 10.4 and 10.6 through 10.9) are each configured analogously to first fastening device 10.1.

Figure 5A:
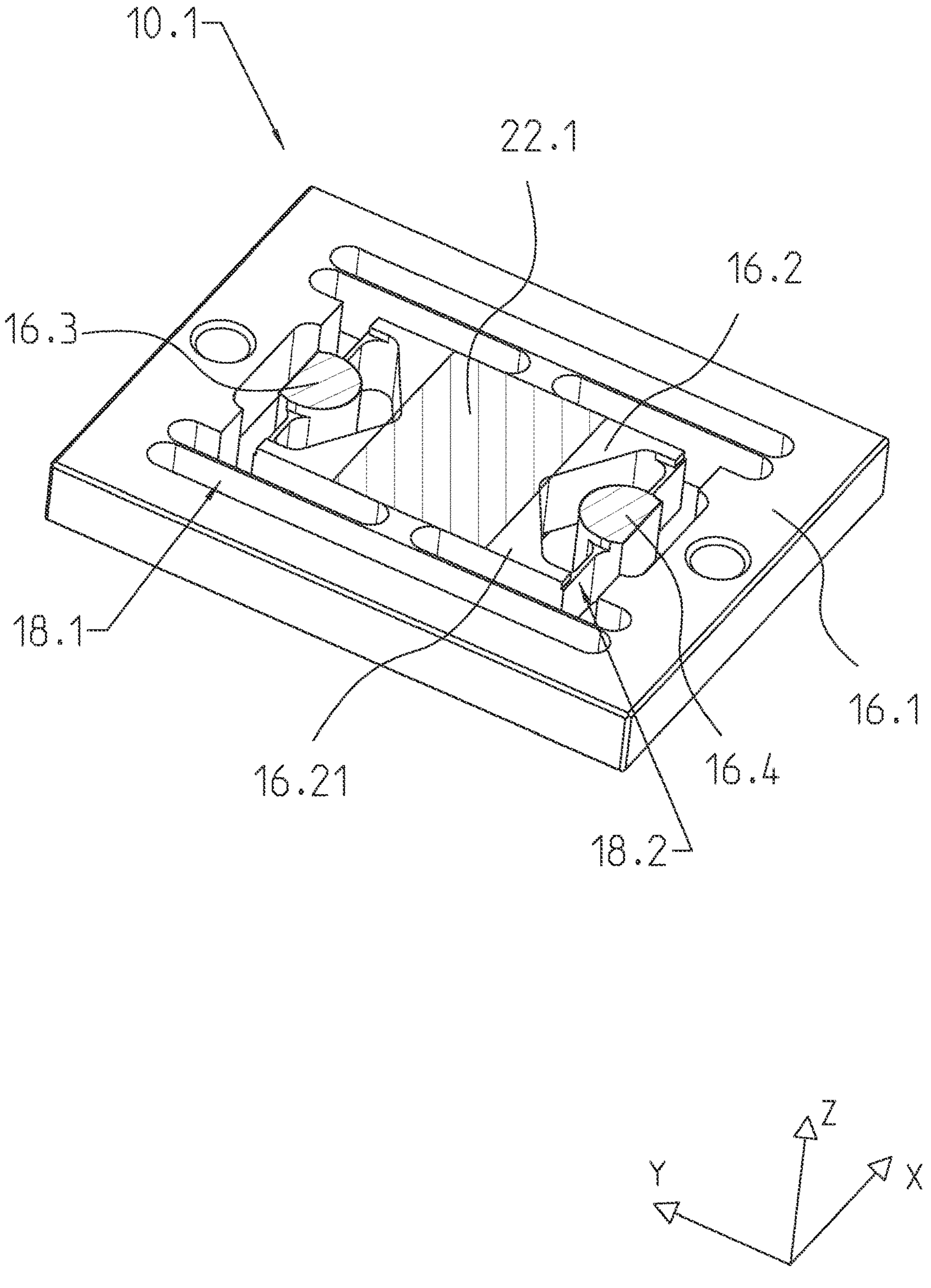
FIG. 5*a* is a perspective view of a first fastening device of the first portion shown in FIG. 3*a;*
Figure 5B:
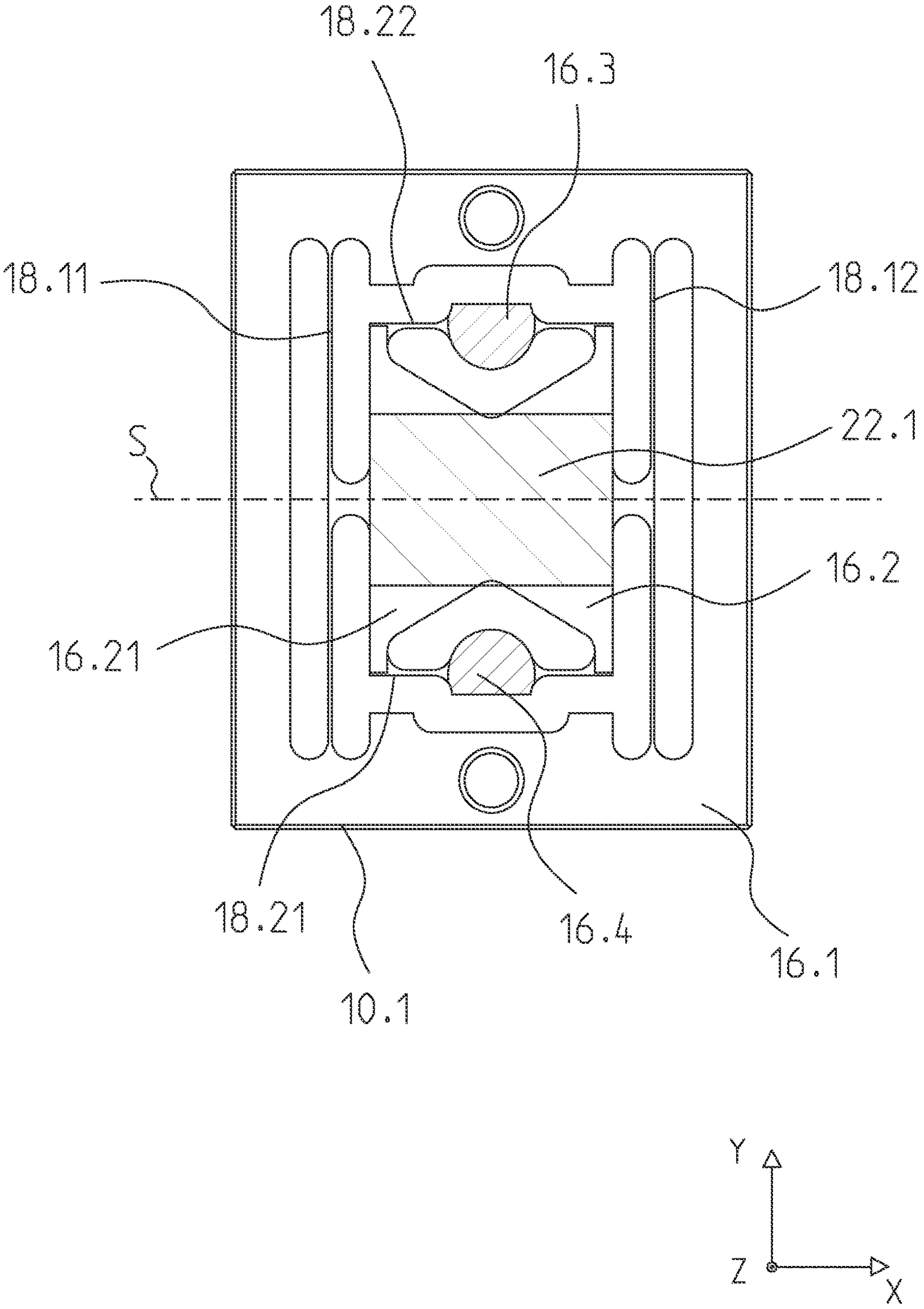
FIG. 5*b* is a plan view of the first fastening device shown in FIG. 5*a;*
Figure 5C:
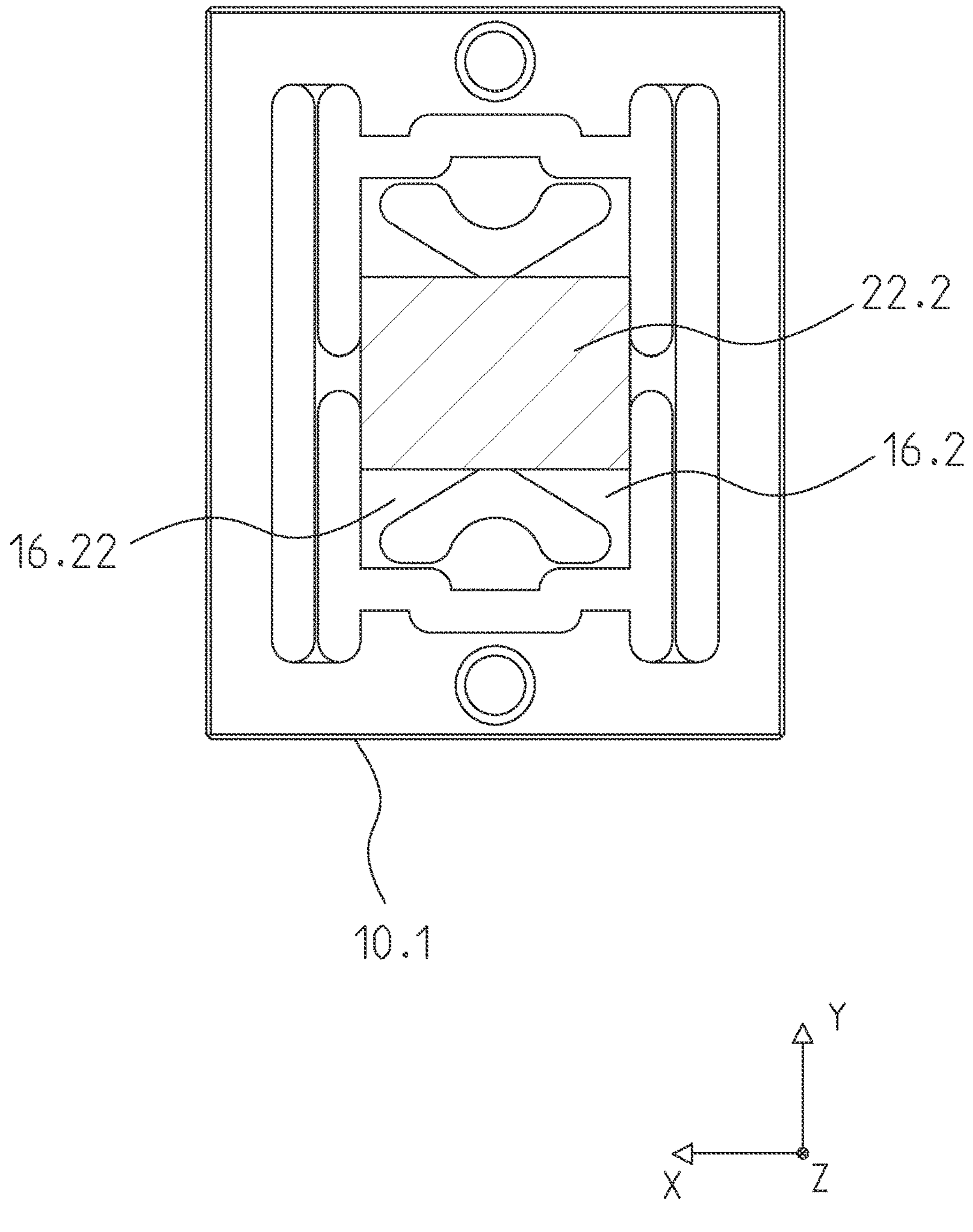
FIG. 5*c* is a bottom view of the first fastening device shown in FIG. 5*a;*
Figure 5D:
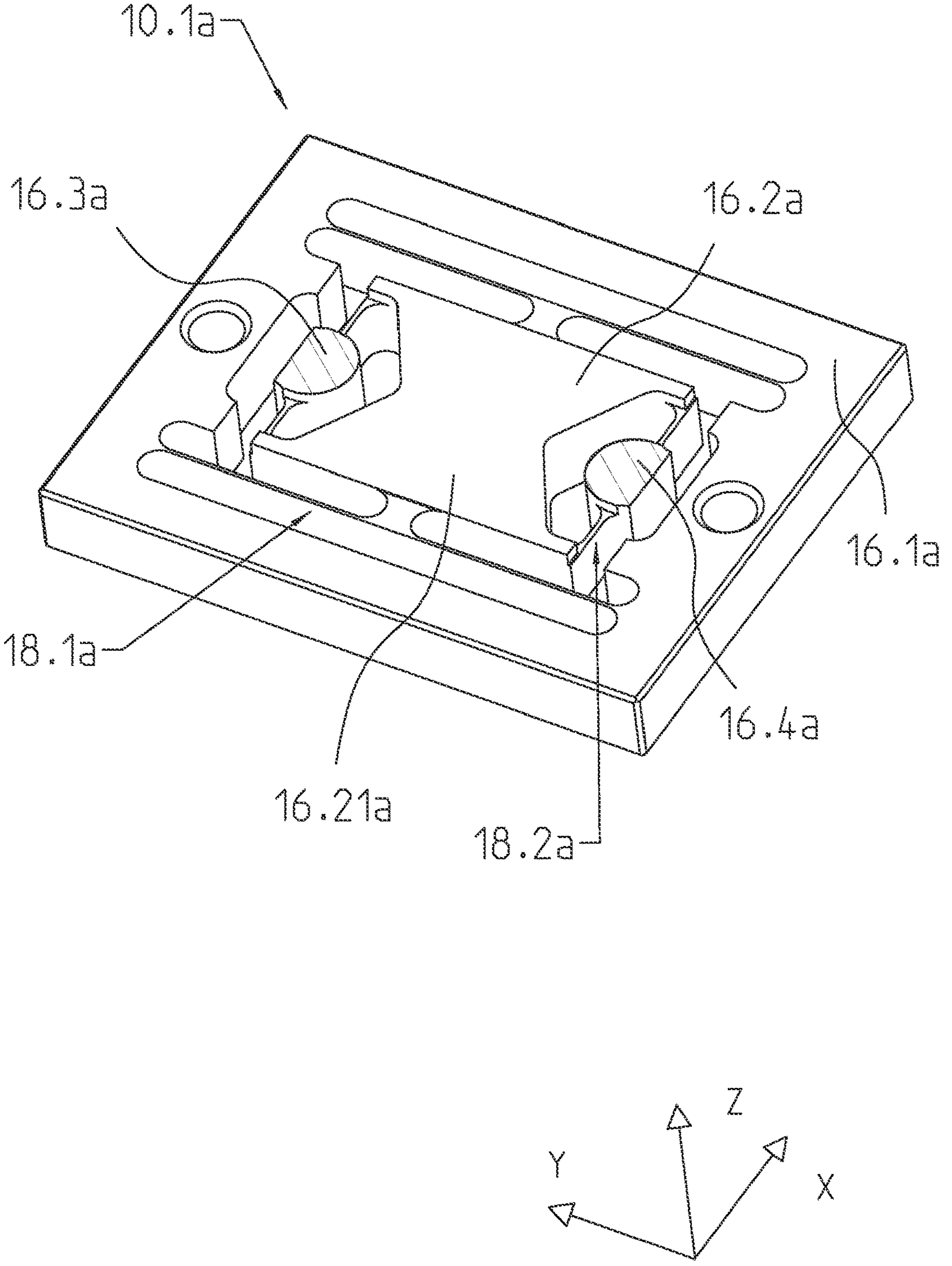
FIG. 5*d* is a perspective view of an exemplary alternative first fastening device.

FIGS. 5*a* through 5*c* show different views of first fastening device 10.1. FIG. 5*d* shows a perspective view of an exemplary alternative first fastening device 10.1*a*. The alternative first fastening device 10.1*a* may form part of the assembly of FIG. 1 in place of first fastening device 10.1.

As shown in FIG. 5*a*, first fastening device 10.1 has a first portion 16.1 for fastening first fastening device 10.1 to base 1, a second portion 16.2 connected to first portion 16.1 for supporting scale 12, as well as a third and a fourth portion 16.3, 16.4 for fastening first edge portions 12.11 of scale 12 to first fastening device 10.1. First fastening device 10.1 has a first pair of flexure bearings 18.1. The flexure bearings 18.1 of the first pair are configured to allow second portion 16.2 to move relative to first portion 16.1 in longitudinal direction X. First fastening device 10.1 has a second pair of flexure bearings 18.2. The flexure bearings 18.2 of the second pair are configured to allow third and fourth portions 16.3, 16.4 to move relative to second portion 16.2 in transverse direction Y.

According to FIG. 5*a*, first portion 16.1 and second portion 16.2 are connected to each other via the first pair of flexure bearings 18.1. Moreover, according to FIG. 5*a*, third and fourth portions 16.3, 16.4 and second portion 16.2 are connected to each other via the second pair of flexure bearings 18.2.

As can be seen in FIG. 5*b*, flexure bearings 18.1 of the first pair have two first flat springs 18.11, 18.12 disposed opposite each other in longitudinal direction X. First flat springs 18.11, 18.12 are oriented perpendicularly to reference axis S. It can also be seen in FIG. 5*b* that flexure bearings 18.2 of the second pair have two second flat springs 18.21, 18.22 disposed opposite each other in transverse direction Y. Second flat springs 18.21, 18.22 are oriented parallel to reference axis S. Referring to FIG. 5*a*, first and second flat springs 18.11, 18.12; 18.21, 18.22 each extend in a vertical direction Z. Vertical direction Z extends perpendicular to measuring graduation plane A1 (see FIGS. 9*a* and 9*b*).

Figure 9A:
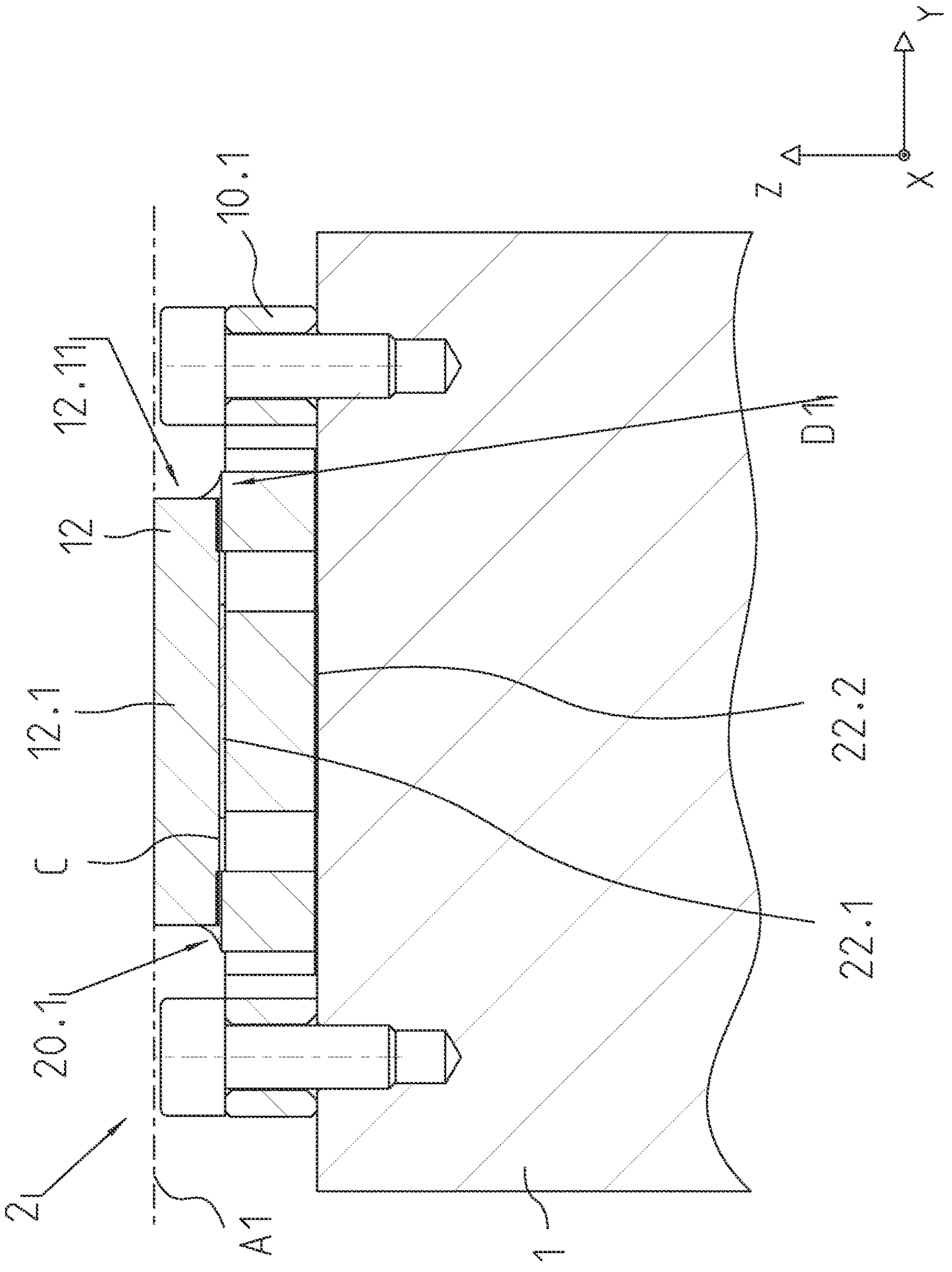
FIG. 9*a* is a cross-sectional view taken along a section line A-A in FIG. 3*b*.

Referring to FIGS. 5*a* and 9*a*, third and fourth portions 16.3, 16.4 are fastened by a first material-to-material bond 20.1 at least to an underside C of scale 12 (i.e., a side facing the base 1). In this way, a first underside fastening connection of scale 12 is obtained at first position P1. First material-to-material bond 20.1 is in particular a preferably rigid adhesive bond. Bonding surfaces of third and fourth portions 16.3, 16.4 for the adhesive bond (i.e., first material-to-material bond 20.1) are shown hatched in FIG. 5*a*. First material-to-material bond includes two adhesive beads (see FIG. 9*a*) adjoining two side faces of scale 12 which are disposed opposite each other in transverse direction Y. As shown in FIG. 9*a*, the side faces of scale 12 each extend in longitudinal direction X.

As shown in FIG. 5*a*, first fastening device 10.1 has a first adhesive means 22.1. First adhesive means 22.1 is an elastically deformable means. First adhesive means 22.1 is disposed on a top face 16.21 of second portion 16.2 (i.e., a surface facing scale 12) and in transverse direction Y between third portion 16.3 and fourth portion 16.4. First adhesive means 22.1 is in particular a low-friction adhesive tape (first alternative) or a double-sided adhesive tape (second alternative).

If first adhesive means 22.1 is a double-sided adhesive tape, then it is used to additionally fasten scale 12 to first fastening device 10.1.

In the case of the first alternative, first adhesive means 22.1 forms a bearing surface for scale 12. The low-friction adhesive tape is composed of, for example, a plastic layer and an adhesive layer. This adhesive layer fastens the low-friction adhesive tape to first fastening device 10.1. Furthermore, this adhesive layer serves as a compensating element during shrinkage of first material-to-material bond 20.1 (i.e., preferably rigid adhesive bond). This substantially prevents scale 12 from changing its shape, thereby increasing the accuracy of position measurement. In the case of the first alternative, moreover, first adhesive means 22.1 allows displacement of scale 12 after scale 12 is placed on first fastening device 10.1. This is advantageous during adjustment of the position of scale 12.

In the case of the second alternative, first adhesive means 22.1 again forms a bearing surface for scale 12. As in the case of the first alternative, the double-sided adhesive tape serves as an advantageous compensating element during shrinkage of first material-to-material bond 20.1. In the case of the second alternative, moreover, first adhesive means 22.1 allows scale 12 to be immediately fixed in position after scale 12 is placed on first fastening device 10.1. This allows for a flexible mounting position, particularly for what is referred to as overhead mounting.

As can be seen in the bottom view of FIG. 5*c*, first fastening device 10.1 has a second adhesive means 22.2 for fastening first fastening device 10.1 to base 1. Second adhesive means 22.2 is a damping means. Second adhesive means 22.2 is disposed on a bottom face 16.22 of second portion 16.2 (i.e., a surface facing away from scale 12) and in transverse direction Y between third portion 16.3 and fourth portion 16.4. Second adhesive means 22.2 is in particular a double-sided adhesive tape.

Second adhesive means 22.2 serves, for example, as a spring-damper system. This spring-damper system has a frequency-dependent response. In the case of slow movements, it provides relatively low rigidity so that a desired mechanical decoupling is not affected. In the presence of high excitation frequencies, such as typically occur in highly dynamic applications, it acts as a damper with high restoring forces, which allows for relatively high natural frequencies both in degree of freedom X and in a degree of freedom RX.

Referring to FIG. 5*d*, the alternative first fastening device 10.1*a* is configured analogously to first fastening device 10.1. However, unlike first fastening device 10.1, the alternative first fastening device 10.1*a* does not have a first adhesive means (hereinafter "third alternative"). Moreover, unlike first fastening device 10.1, top face 16.21*a* of second portion 16.2*a* of the alternative first fastening device 10.1*a* is raised relative to the first pair of flexure bearings 18.1*a*.

In the case of the third alternative, a bearing surface for scale 12 is provided by the alternative first fastening device 10.1*a* itself (i.e., by second portion 16.2*a*). The alternative first fastening device 10.1*a* is preferably made of steel.

Figure 6A:
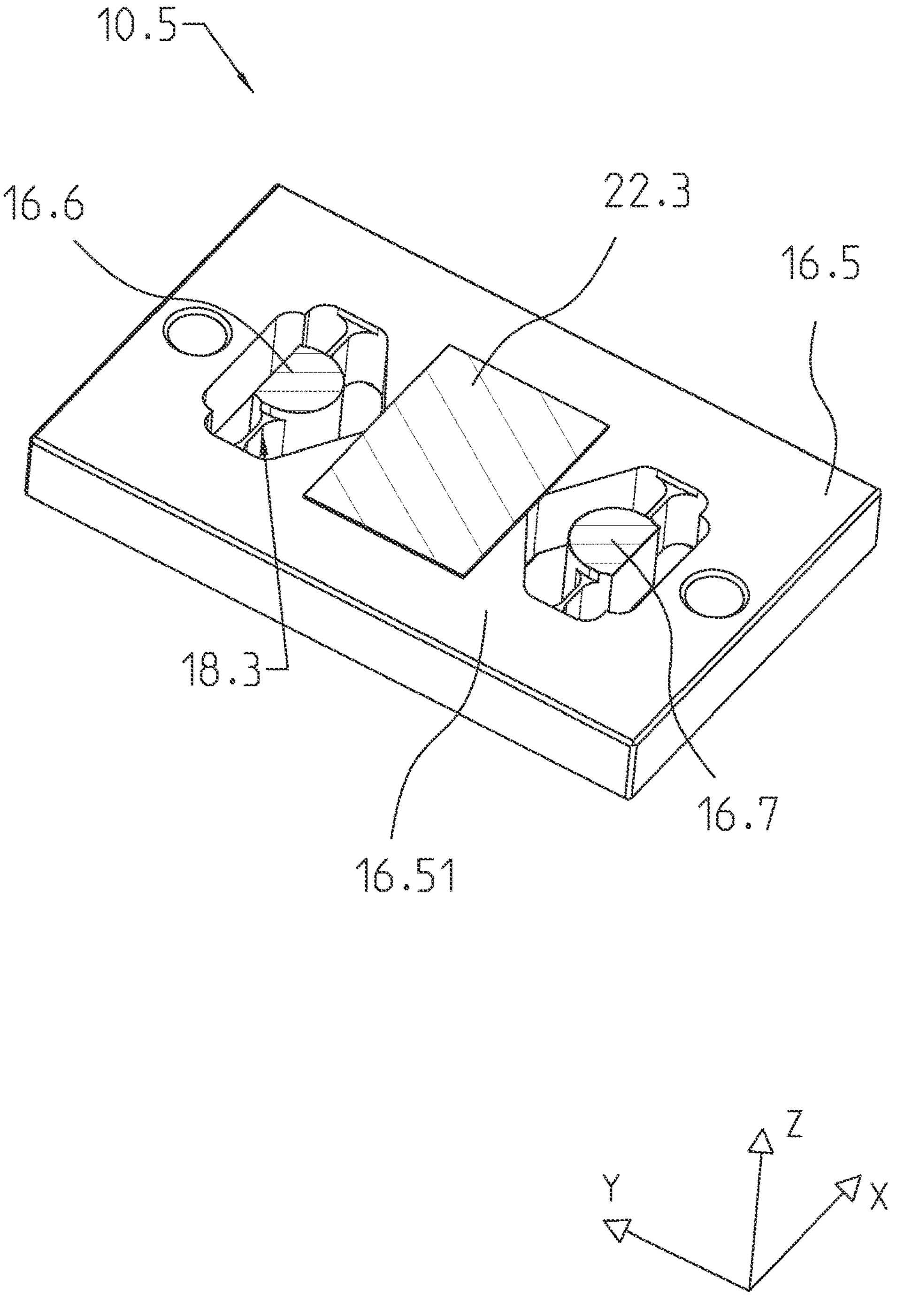
FIG. 6*a* is a perspective view of a second fastening device of the second portion shown in FIG. 4*a;*
Figure 6B:
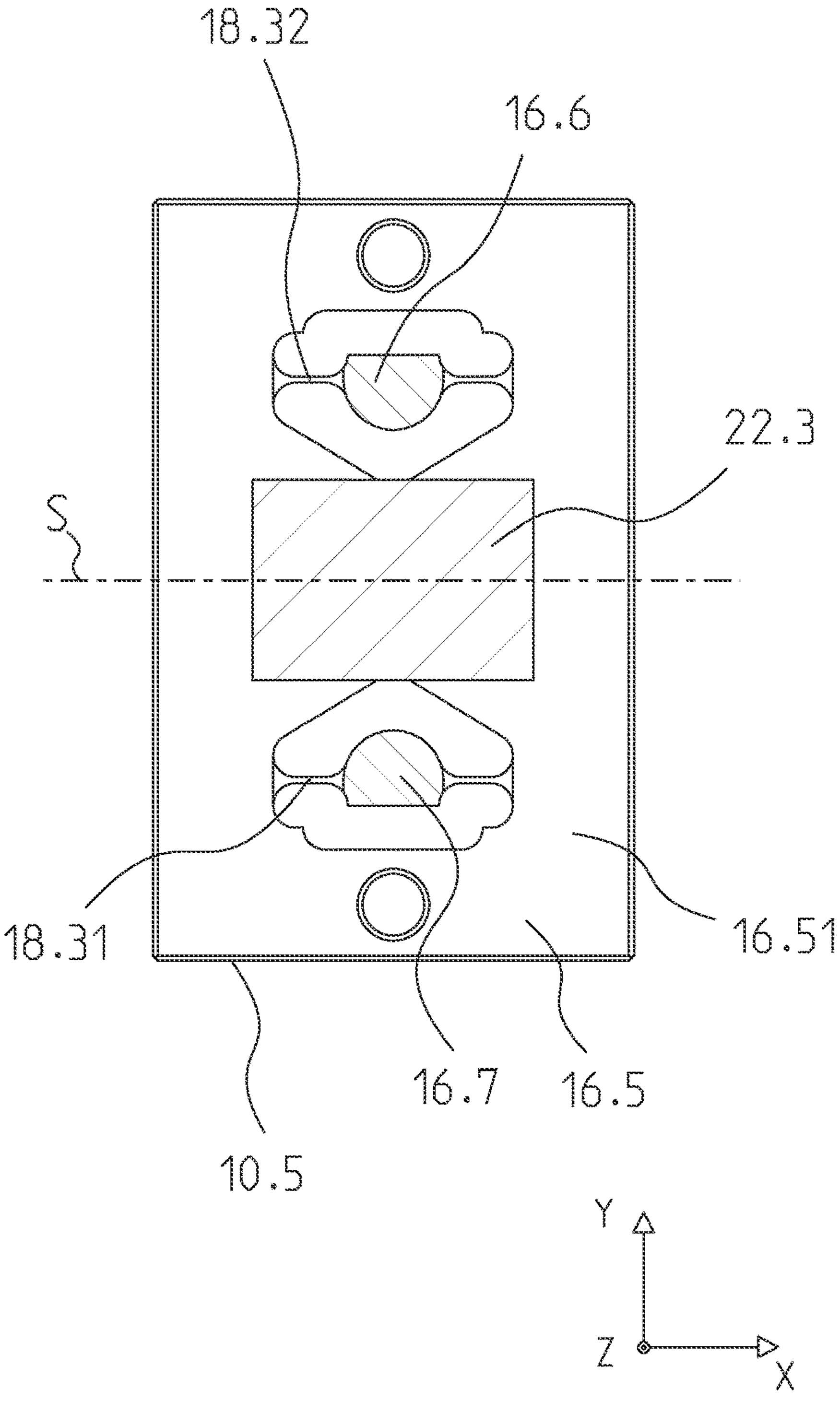
FIG. 6*b* is a plan view of the second fastening device shown in FIG. 6*a;*
Figure 6C:
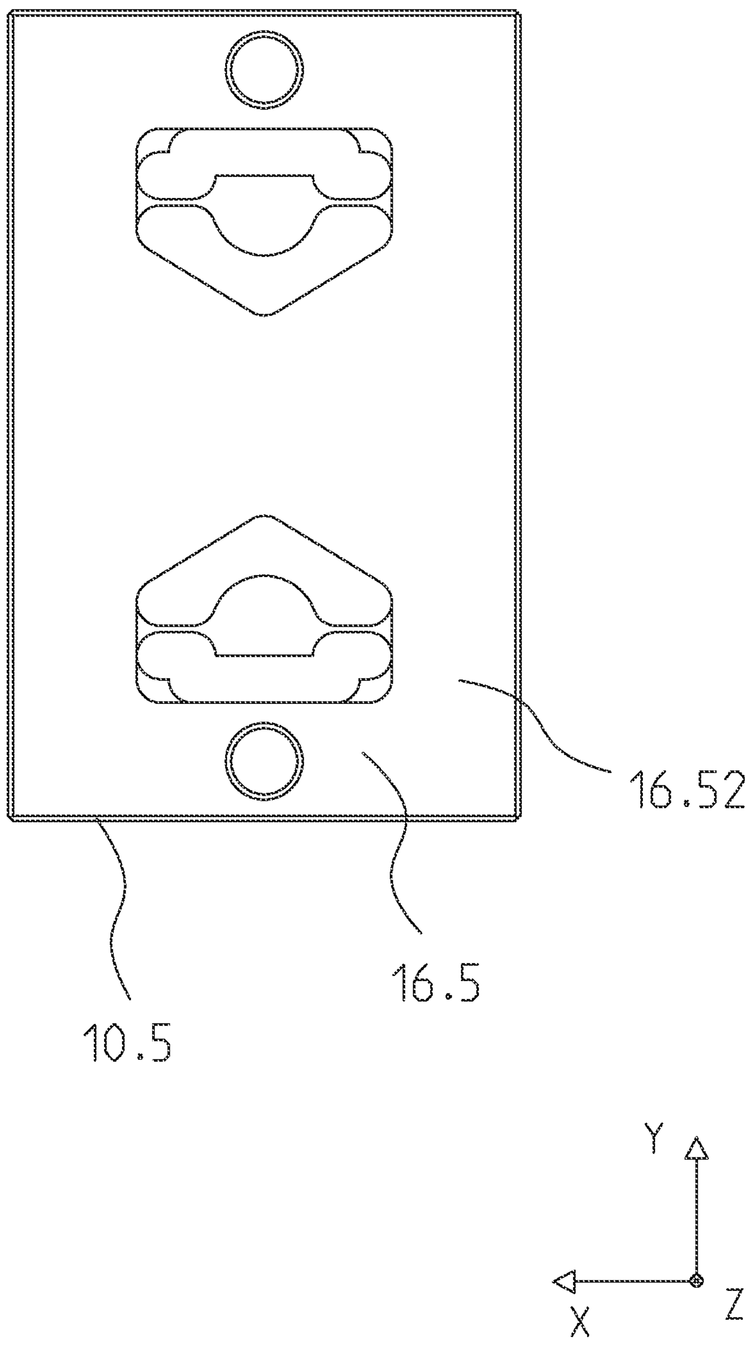
FIG. 6*c* is a bottom view of the second fastening device shown in FIG. 6*a;*
Figure 6D:
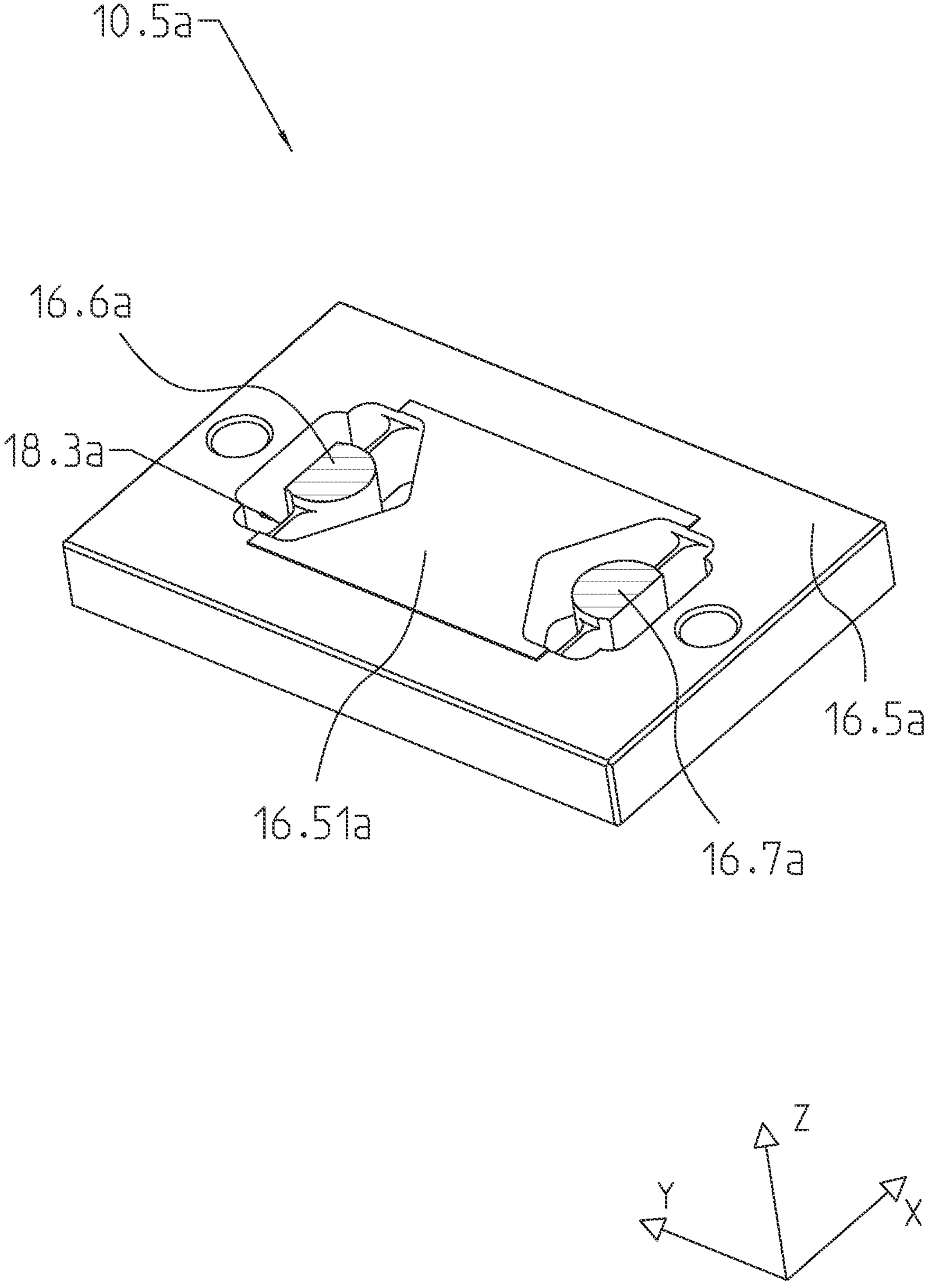
FIG. 6*d* is a perspective view of an exemplary alternative second fastening device.

FIGS. 6*a* through 6*c* show different views of second fastening device 10.5. FIG. 6*d* shows a perspective view of an exemplary alternative second fastening device 10.5*a*. The alternative second fastening device 10.5*a* may form part of the assembly of FIG. 1 in place of second fastening device 10.5.

Figure 9B:
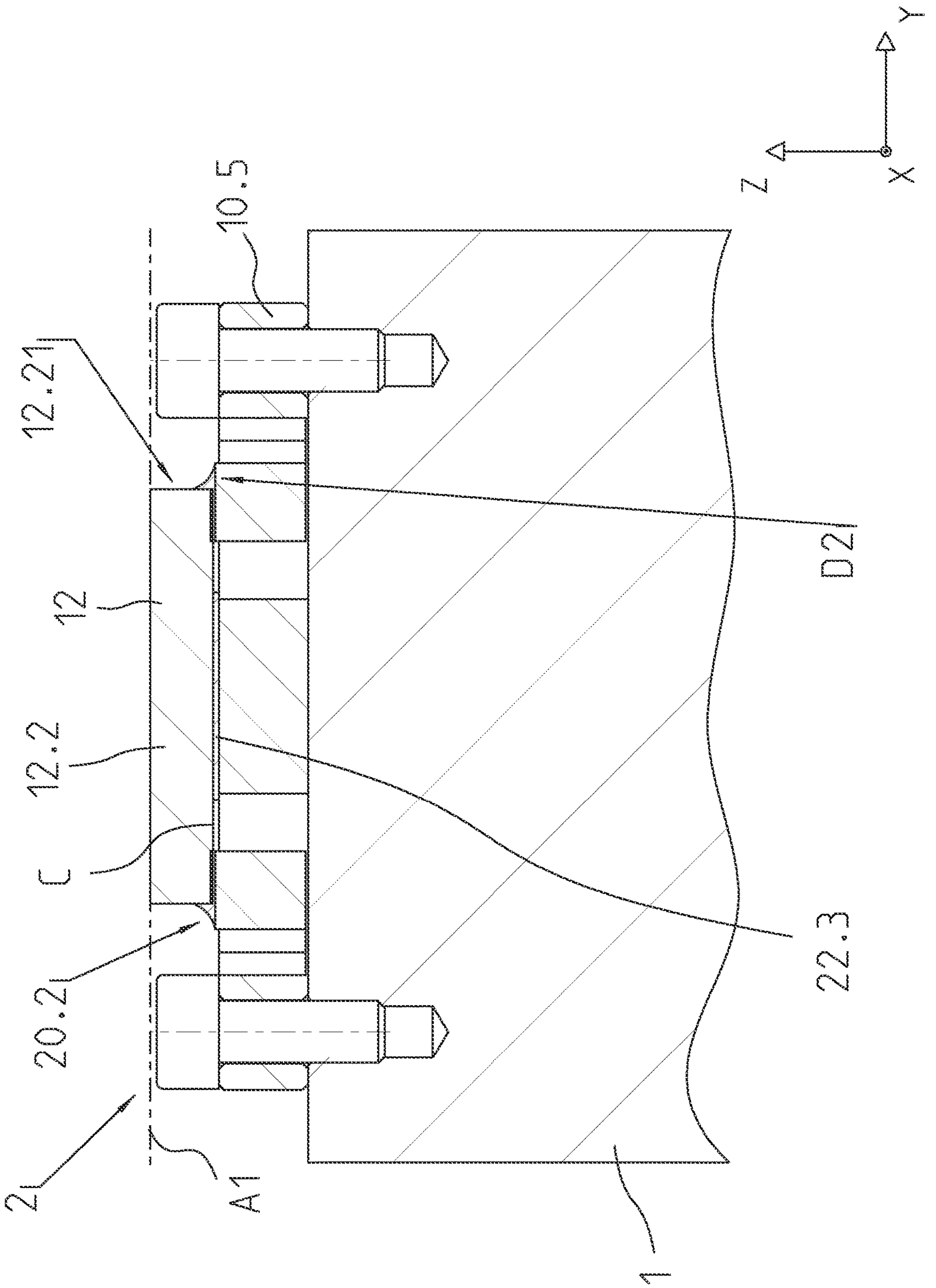
FIG. 9*b* is a cross-sectional view taken along a section line B-B in FIG. 4*b.*

Referring to FIGS. 6*a* and 9*b*, second fastening device 10.5 has a fifth portion 16.5 for fastening second fastening device 10.5 to base 1, as well as a sixth and a seventh portion 16.6, 16.7 connected to fifth portion 16.5 for fastening second edge portions 12.21 of scale 12 to second fastening device 10.5. As shown in FIG. 6*a*, second fastening device 10.5 has a third pair of flexure bearings 18.3. The flexure bearings 18.3 of the third pair are configured to allow sixth and seventh portions 16.6, 16.7 to move relative to fifth portion 16.5 in transverse direction Y.

As can be seen in FIG. 6*b*, flexure bearings 18.3 of the third pair have two third flat springs 18.31, 18.32 disposed opposite each other in transverse direction Y. Third flat springs 18.31, 18.32 are oriented parallel to reference axis S. Third flat springs 18.31, 18.32 each extend in vertical direction Z (see FIG. 6*a*).

Referring to FIGS. 6*a* and 9*b*, sixth and seventh portions 16.6, 16.7 are fastened by a second material-to-material bond 20.2 at least to underside C of scale 12. In this way, a second underside fastening connection of scale 12 is obtained at second position P2. Second material-to-material bond 20.2 is in particular a preferably rigid adhesive bond. Bonding surfaces of sixth and seventh portions 16.6, 16.7 for the adhesive bond (i.e., second material-to-material bond 20.2) are shown hatched in FIG. 6*a*. Second material-to-material bond 20.2 has two adhesive beads adjoining the side faces of scale 12 (see FIG. 9*b*).

As shown in FIG. 6*a*, second fastening device 10.5 has a third adhesive means 22.3. Third adhesive means 22.3 is an elastically deformable means. Third adhesive means 22.3 is disposed on a top face 16.51 of fifth portion 16.5 (i.e., a surface facing scale 12) and in transverse direction Y between sixth portion 16.6 and seventh portion 16.7. Third means 22.3 is in particular a low-friction adhesive tape (fourth alternative) or a double-sided adhesive tape (fifth alternative).

If third means 22.3 is a double-sided adhesive tape, then it is used to additionally fasten scale 12 to second fastening device 10.5.

In the case of the fourth alternative, third adhesive means 22.3 forms a bearing surface for scale 12. The low-friction adhesive tape is composed of, for example, a plastic layer and an adhesive layer. This adhesive layer fastens the low-friction adhesive tape to second fastening device 10.5. Furthermore, this adhesive layer serves as a compensating element during shrinkage of second material-to-material bond 20.2 (i.e., preferably rigid adhesive bond). This substantially prevents scale 12 from changing its shape, thereby increasing the accuracy of position measurement. In the case of the fourth alternative, moreover, third adhesive means 22.3 allows displacement of scale 12 after scale 12 is placed on second fastening device 10.5. This is advantageous during adjustment of the position of scale 12.

In the case of the fifth alternative, third adhesive means 22.3 again forms a bearing surface for scale 12. As in the case of the fourth alternative, the double-sided adhesive tape serves as an advantageous compensating element during shrinkage of second material-to-material bond 20.2. In the case of the fifth alternative, moreover, third adhesive means 22.3 allows scale 12 to be immediately fixed in position after scale 12 is placed on second fastening device 10.5. This allows for a flexible mounting position, particularly for what is referred to as overhead mounting.

Referring to FIG. 6*d*, the alternative second fastening device 10.5*a* is configured analogously to second fastening device 10.5. However, unlike second fastening device 10.5, the alternative second fastening device 10.5*a* does not have a third adhesive means (hereinafter "sixth alternative"). Moreover, unlike second fastening device 10.5, top face

16.51*a* of fifth portion 16.5*a* of the alternative second fastening device 10.5*a* is raised relative to the fifth section 16.5*a* (see FIG. 6*d*).

In the case of the sixth alternative, a bearing surface for scale 12 is provided by the alternative second fastening device 10.5*a* itself (i.e., by fifth portion 16.5*a*). The alternative second fastening device 10.5*a* is preferably made of steel.

The first through sixth alternatives each provide a defined bonding gap for the respective first or second material-to-material bond 20.1, 20.2 (see FIGS. 9*a* and 9*b*).

As shown in FIGS. 9*a* and 9*b*, first fastening device 10.1 provides a first bearing surface D1 for first material-to-material bond 20.1, and second fastening device 10.5 provides a second bearing surface D2 for second material-to-material bond 20.2. First and second bearing surfaces D1, D2, together with the side faces of scale 12, each serve as a dispensing aid for a dispensing needle. The dispensing aid facilitates the application/dispensing of an adhesive.

As shown in FIG. 9*a*, underside C of scale 12 is disposed above first bearing surface D1 in vertical direction (Z). A height (Z-position) of underside C is set by first adhesive means 22.1 (i.e., the thickness thereof). A first interstitial space is formed between first bearing surface D1 and underside C.

As shown in FIG. 9*b*, underside C of scale 12 is disposed above second bearing surface D2 in vertical direction (Z). A height (Z-position) of underside C is set by third adhesive means 22.3 (i.e., the thickness thereof). A second interstitial space is formed between second bearing surface D2 and underside C.

The aforementioned defined bonding gap is provided by the first and second interstitial spaces, respectively (first, second, fourth, and fifth alternatives).

In the case of the third and sixth alternatives, the height (Z-position) of underside C is set by the respective (raised) top faces 16.21*a* (see FIGS. 5*d*) and 16.51*a* (see FIG. 6*d*) to create the respective interstitial space analogously to the first, second, fourth, and fifth alternatives.

Figure 7A:
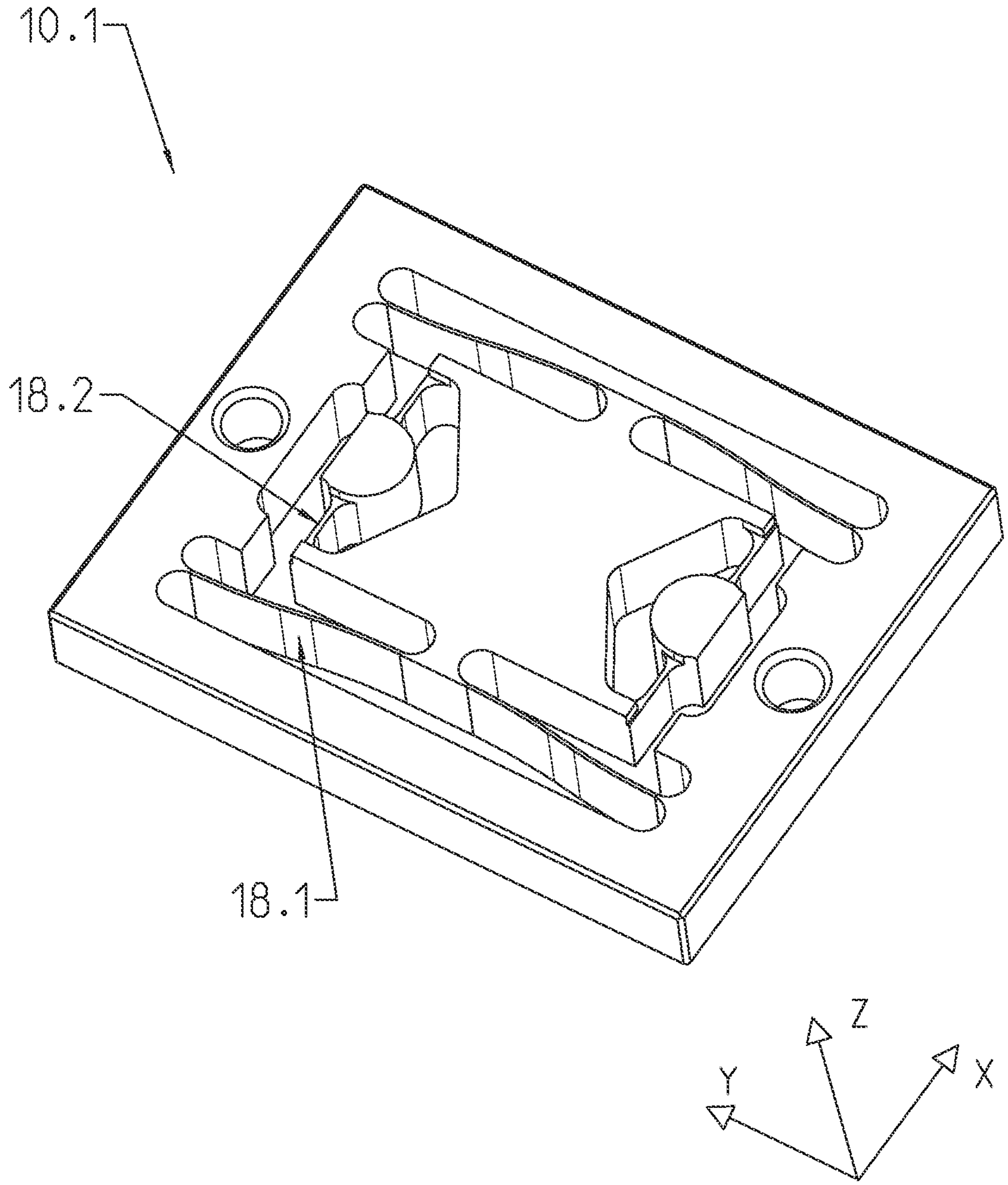
FIG. 7*a* is a perspective view showing the first fastening device of FIG. 5*a* in a first deflected state.
Figure 7B:
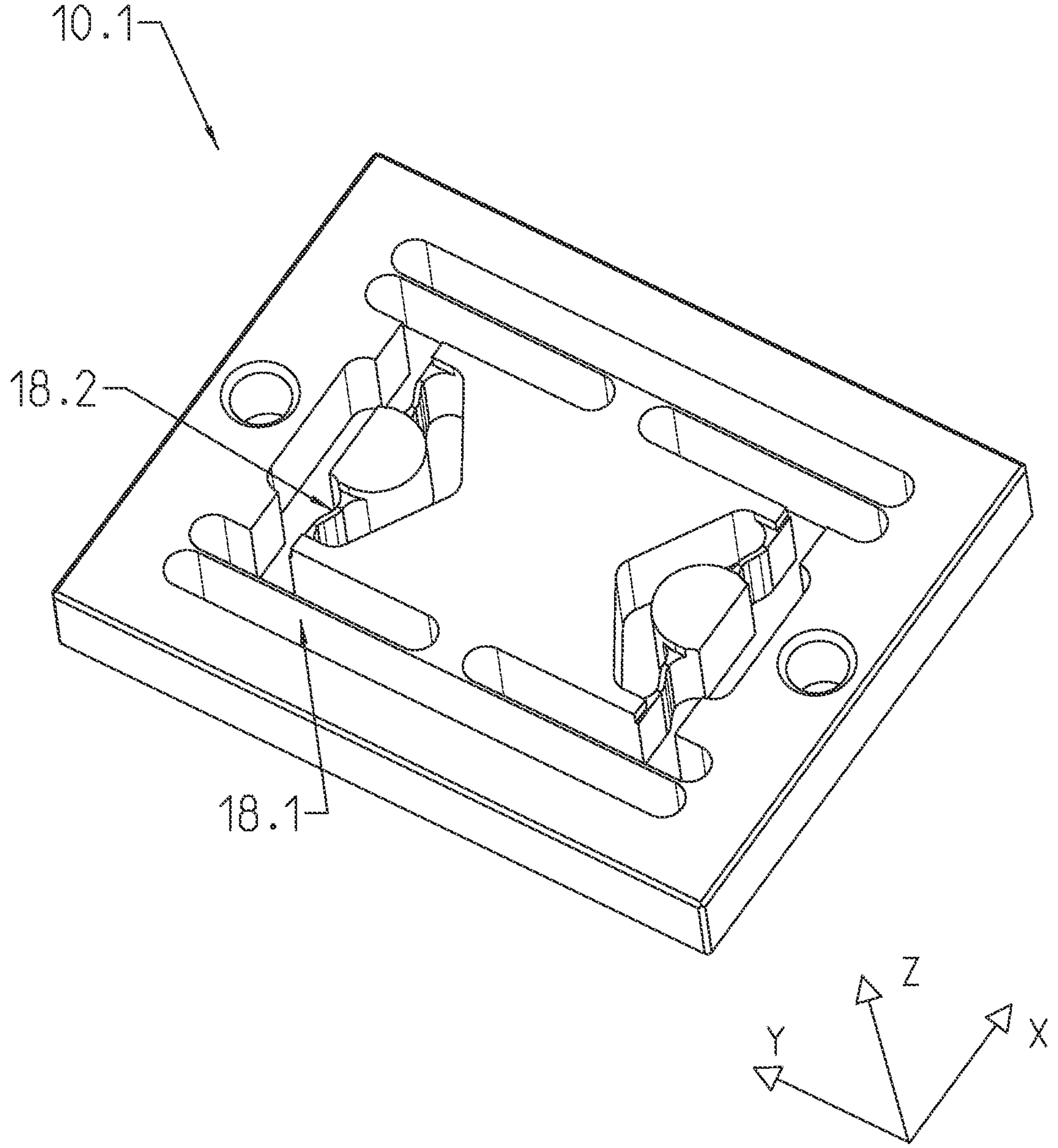
FIG. 7*b* is a perspective view showing the first fastening device of FIG. 5*a* in a second deflected state.
Figure 8:
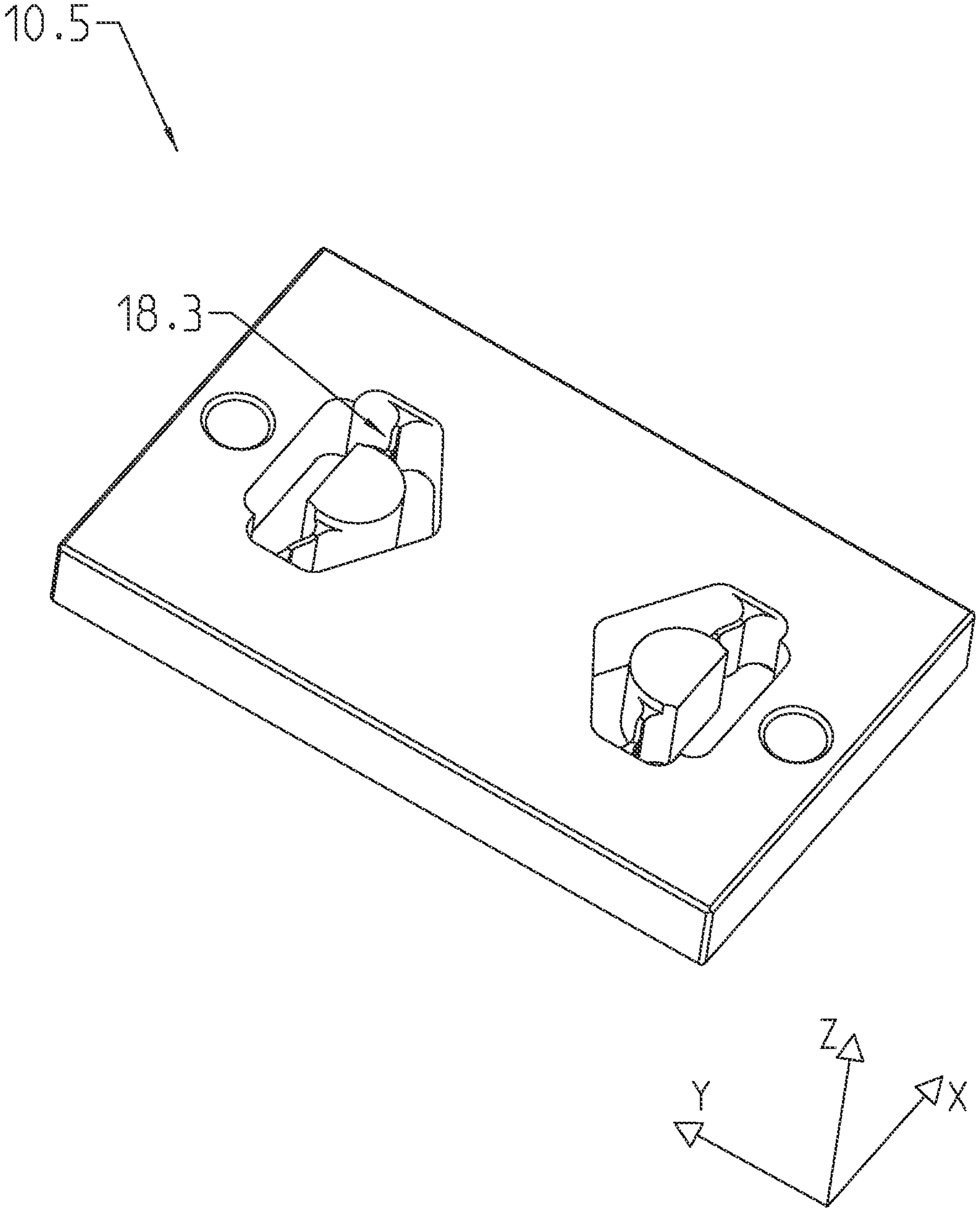
FIG. 8 is a perspective view showing the second fastening device of FIG. 6*a* in a deflected state.

The deflected states of first and second fastening devices 10.1, 10.5, illustrated in FIGS. 7*a*, 7*b* and 8, are achieved by means of the first through third pairs of flexure bearings 18.1 through 18.3. In FIGS. 7*a*, 7*b* and 8, the elements previously shown in hatching (bonding surfaces as well as first and third adhesive means 22.1, 22.3) have been omitted. FIG. 7*a* shows first fastening device 10.1 in the first deflected state. This corresponds, as it were, to a decoupling in the following degree of freedom: X_exterior free. FIG. 7*b* shows first fastening device 10.1 in the second deflected state. This corresponds, as it were, to a decoupling in the following degree of freedom: Y_interior free. FIG. 8 shows second fastening device 10.5 in the deflected state. This corresponds, as it were, to a decoupling in the following degree of freedom: Y_interior free.

The first pair of flexure bearings 18.1 has a first stiffness. The second pair of flexure bearings 18.2 has a second stiffness. Preferably, the second stiffness is greater, preferably more than a hundred times greater, than the first stiffness. The third pair of flexure bearings 18.3 has a third stiffness. The second stiffness and the third stiffness are preferably equal.

Embodiments of the invention have in particular the following advantages. A monolithic construction of first and second fastening devices 10.1, 10.5 leads to relatively low manufacturing costs and permits relatively simple adjustment/mounting of the assembly. In addition, the monolithic construction achieves a relatively high inherent stiffness for the assembly. By designing and positionally fixing scale 12 symmetrically with respect to axis of symmetry S, a symmetrical drift behavior and a symmetric decoupling are achieved in the degree of freedom Y_interior; i.e., a preferably symmetric movement of first and second edge portions 12.11, 12.21. Despite the aforementioned symmetric decoupling, a relatively high natural frequency (i.e., retention in a substantially fixed position) is achieved in the degree of freedom Y_exterior. Moreover, embodiments of the invention enable a decoupling in the degree of freedom X_exterior at least at first position P1. Overall, this allows effects caused by a change in temperature to be prevented to the extent possible. In addition, this makes it possible to achieve the relatively high inherent stiffness for the assembly.

By means of embodiments of the invention, stresses caused within an adhesive for forming first and second material-to-material bonds 20.1, 20.2 due to different thermal expansion coefficients and/or a change in the ambient temperature are eliminated. This is achieved by a special layout of bonding surfaces in terms of shape, position and number (i.e., bonding surfaces of third and fourth portions 16.3, 16.4 or 16.3*a*, 16.4*a* and bonding surfaces of sixth and seventh portions 16.6, 16.7 or 16.6*a*, 16.7*a*) for the adhesive bond (i.e., first and second material-to-material bonds 20.1, 20.2), such as is illustrated in FIGS. 5*a*, 5*b*, 5*d* and FIGS. 6*a*, 6*b*, 6*d*. This prevents failure of the adhesive bond (e.g., due to breaking of the same).

The invention is not limited to the photoelectric scanning principle. In particular, measuring graduation 14 may also be adapted to be scannable magnetically or inductively.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An assembly comprising:

a support having a plurality of individual sections, the individual sections of the support each being configured as a fastening device; and a scale disposed on the support, the scale extending in a longitudinal direction, and the scale having a measuring graduation disposed in a measuring graduation plane for position measurement at least in the longitudinal direction wherein a first one of the fastening devices is configured to support a first cross section of the scale on the support at a first position in such a manner that the first cross section of the scale is freely movable in the longitudinal direction relative to the support and fixed in a transverse direction perpendicular to the longitudinal direction, and wherein a second one of the fastening devices is configured to support a second cross section of the scale on the support at a second position different from the first position in such manner that the second cross section of the scale is fixed in the longitudinal direction and in the transverse direction, wherein the first and second fastening devices are configured to allow first and second edge portions of the scale, which are disposed opposite each other in the transverse direction, to move relative to the support perpendicularly to a reference axis at the respective first and second positions, the reference axis extending parallel to the longitudinal direction.

2. The assembly as recited in claim 1, wherein the reference axis is an axis of symmetry of the scale.

3. The assembly as recited in claim 1, wherein the first and second fastening devices are configured to allow the first and second edge portions of the scale to move relative to the support toward or away from the reference axis at the respective first and second positions.

4. The assembly as recited in claim 1, wherein the first and second fastening devices are configured to allow the first and second edge portions of the scale to move relative to the support symmetrically with respect to the reference axis at the respective first and second positions.

5. The assembly as recited in claim 1, wherein the first fastening device has a first portion configured to fasten the first fastening device to a base, a second portion connected to the first portion configured to support the scale, as well as a third and a fourth portion configured to fasten the first edge portions of the scale to the first fastening device, wherein the first fastening device has a first pair of flexure bearings configured to allow the second portion to move relative to the first portion in the longitudinal direction, and wherein the first fastening device has a second pair of flexure bearings configured to allow the third and fourth portions to move relative to the second portion in the transverse direction.

6. The assembly as recited in claim 5, wherein the flexure bearings of the first pair have two first flat springs disposed opposite each other in the longitudinal direction, the first flat springs being oriented perpendicularly to the reference axis, and wherein the flexure bearings of the second pair have two second flat springs disposed opposite each other in the transverse direction, the second flat springs being oriented parallel to the reference axis, the first and second flat springs each extending in a vertical direction perpendicular to the measuring graduation plane.

7. The assembly as recited in claim 5, wherein the third and fourth portions are fastened by a first material-to-material bond at least to an underside of the scale.

8. The assembly as recited in claim 5, wherein the first fastening device has a first adhesive that is elastically deformable, the first adhesive being disposed on a top face of the second portion and in the transverse direction between the third portion and the fourth portion.

9. The assembly as recited in claim 5, wherein the first fastening device has a second adhesive that has damping properties configured to fasten the first fastening device to the base, the second adhesive being disposed on a bottom face of the second portion and in the transverse direction between the third portion and the fourth portion.

10. The assembly as recited in claim 1, wherein the second fastening device has a fifth portion configured to fasten the second fastening device to the base, as well as a sixth and a seventh portion connected to the fifth portion configured to fasten the second edge portions of the scale to the second fastening device; wherein the second fastening device has a third pair of flexure bearings configured to allow the sixth and seventh portions to move relative to fifth portion in the transverse direction.

11. The assembly as recited in claim 10, wherein the flexure bearings of the third pair have two third flat springs disposed opposite each other in the transverse direction, the third flat springs being oriented parallel to the reference axis, and the third flat springs each extending in a vertical direction perpendicular to the measuring graduation plane.

12. The assembly as recited in claim 10, wherein the sixth and seventh portions are fastened by a second material-to-material bond at least to an underside of the scale.

13. The assembly as recited in claim 10, wherein the second fastening device has a third adhesive that is elastically deformable, the third adhesive being disposed on a top face of the fifth portion and in the transverse direction between the sixth portion and the seventh portion.

14. The assembly as recited in claim 1, wherein the first and second fastening devices are each of single-piece construction.

15. The assembly as recited in claim 1, wherein the first fastening device and the first cross section of the scale, as well as the second fastening device and the second cross section of the scale, are respectively directly connected to each other.

16. The assembly as recited in claim 1, wherein the first position is at a first longitudinal end of the scale, and wherein the second position is between the first position and a second longitudinal end of the scale opposite the first longitudinal end.

* * * * *